(12) United States Patent
Day et al.

(10) Patent No.: US 11,758,837 B2
(45) Date of Patent: Sep. 19, 2023

(54) SPRAY APPARATUS FOR A VEHICLE

(71) Applicant: Discovery Purchaser Corporation, Wilmington, DE (US)

(72) Inventors: Pascal Day, Lyons (FR); Thomas Arians, Rommerskirchen (FR); Reinhard Friessleben, Leverkusen (DE)

(73) Assignee: Discovery Purchaser Corporation, Wilmington, DE (US)

( * ) Notice: Subject to any disclaimer, the term of this patent is extended or adjusted under 35 U.S.C. 154(b) by 355 days.

(21) Appl. No.: 16/969,116

(22) PCT Filed: Feb. 11, 2019

(86) PCT No.: PCT/EP2019/053258
§ 371 (c)(1),
(2) Date: Aug. 11, 2020

(87) PCT Pub. No.: WO2019/158462
PCT Pub. Date: Aug. 22, 2019

(65) Prior Publication Data
US 2021/0037700 A1    Feb. 11, 2021

(30) Foreign Application Priority Data
Feb. 14, 2018  (EP) ..................................... 18156623

(51) Int. Cl.
*A01C 23/00*  (2006.01)
*A01M 7/00*   (2006.01)
*A01C 23/04*  (2006.01)

(52) U.S. Cl.
CPC .......... *A01C 23/007* (2013.01); *A01C 23/047* (2013.01); *A01M 7/0042* (2013.01)

(58) Field of Classification Search
CPC ..... A01C 23/007; A01C 23/047; A01C 15/04; A01M 7/0042; A01M 7/0014
See application file for complete search history.

(56) References Cited

U.S. PATENT DOCUMENTS 2,220,082 A   11/1940  Daugherty
3,409,221 A   11/1968  Patterson
(Continued)

FOREIGN PATENT DOCUMENTS

EP   0812537 A1   12/1997

OTHER PUBLICATIONS

International Search Report, dated Apr. 18, 2019 for International Application No. PCT/EP2019/053258, filed Feb. 11, 2019, 4 pages.

*Primary Examiner* — Tuongminh N Pham
(74) *Attorney, Agent, or Firm* — MCBEE MOORE & VANIK IP, LLC; Susan McBee (57) ABSTRACT

A spray apparatus for a vehicle includes a processing unit with at least one image of an environment. The processing unit analyzes the at least one image to activate at least one chemical spray unit mounted on the vehicle. Air is blown by at least one air blower mounted on the vehicle into a first downward directed air flow with respect to the vehicle. Air is directed by at least one diverter mounted on the vehicle into a second downward directed air flow with respect to the vehicle. A chemical spray unit of the at least one chemical spray unit is positioned relative to one or more air blowers and is positioned relative to one or more air diverters such that ejected liquid chemical is at least partially entrained within the first downward directed air flow and is at least partially entrained within the second downward directed air flow.

15 Claims, 5 Drawing Sheets

(56) References Cited

U.S. PATENT DOCUMENTS

| | | | | |
|---|---|---|---|---|
| 4,274,589 | A | * | 6/1981 | Jones .................. A01M 7/0014 239/176 |
| 4,609,145 | A | | 9/1986 | Miller |
| 6,018,907 | A | * | 2/2000 | Roehrick ............ A01M 7/0014 47/1.7 |
| 6,105,878 | A | * | 8/2000 | Robinson .................. B05B 7/24 239/166 |
| 9,655,356 | B1 | | 5/2017 | Lytle, Jr. |
| 2015/0245565 | A1 | | 9/2015 | Pilgrim et al. |

* cited by examiner

SPRAY APPARATUS FOR A VEHICLE

CROSS REFERENCE TO RELATED APPLICATIONS

This application is a national stage application under 35 U.S.C. § 371 of International Application No. PCT/EP2019/053258, filed internationally on Feb. 11, 2019, which claims the benefit of European Application No. 18156623.3, filed Feb. 14, 2018.

FIELD OF THE DISCLOSURE

The present invention relates to a spray apparatus for a vehicle, to a spray system, to a spraying method for a vehicle, as well as to a computer program element and a computer readable medium.

BACKGROUND OF THE DISCLOSURE

The general background of this disclosure is the spraying of chemicals for weed control and/or insect control and/or pest control. Farm crops require the spraying of chemical to control weeds, pests or insects and certain industrial areas and areas around railway tracks need to have the vegetation controlled. In both situations, chemicals can be expensive, the application of the chemicals can be expensive and disruptive for example when train track is occupied by a spray train, and there are certain times when chemicals cannot be sprayed for example when the wind is blowing too strongly.

SUMMARY OF THE DISCLOSURE

It would be advantageous to have an improved spray apparatus for a vehicle.

It should be noted that the following described aspects and examples of the invention apply also for the spray apparatus for a vehicle, the spray system, the spraying method for a vehicle, and for the computer program element and the computer readable medium.

According to some embodiments, there is provided a spray apparatus for a vehicle, comprising:

an input unit;
a processing unit;
at least one chemical spray unit;
at least one air blower; and
at least one air diverter.

The input unit is configured to provide the processing unit with at least one image of an environment. The processing unit is configured to analyze the at least one image to activate the at least one chemical spray unit. The at least one chemical spray unit is configured to eject a liquid chemical. The at least one air blower is configured to blow air into a first downward directed air flow with respect to a fore-aft axis of a vehicle that is parallel to the ground. The at least one air diverter is configured to direct air moving as a consequence of movement of the vehicle into a second downward directed air flow with respect to the fore-aft axis of the vehicle. A chemical spray unit of the at least one chemical spray unit is positioned relative to one or more air blowers of the at least one air blower and is positioned relative to one or more air diverters of the at least one air diverter such that the ejected liquid chemical is at least partially entrained within the first downward directed air flow and is at least partially entrained within the second downward directed air flow.

In other words, a spray gun is positioned such that its spray is forced towards the ground due to the combined downwash from air blower(s) and from air flowing past the train that has also been directed (diverted) downwards.

In this way, effects produced by wind such as increased drift that limits the ability to spray when the wind goes above a certain speed can be mitigated and a vehicle can spray when wind speeds are higher. Also, the effects of turbulence and/or simply air flow going under and around the vehicle as a consequence of its movement that limits the speed at which a vehicle can move when spraying can be mitigated and a vehicle can spray when it is moving at higher speeds.

To put this another way, air flow caused by movement of a vehicle is used in combination with a generated airflow to provide a spray that can cope with turbulence, side winds and also with air flow caused by the vehicle's movement all of which otherwise compromise the ability to operate the spray gun.

Thus, farmers have more opportunities to spray their crops with for example herbicides or insecticide or pesticides or fertilizers, because they can spray when the wind is strong when previously they would not have been able to spray. Furthermore, the farmer is able to spray more rapidly because a vehicle such as a tractor can move more rapidly over a field to spray. The same applies to industrial areas that require spraying of weed control chemicals and for operation of spray trains that require spraying of weed control chemicals along railway tracks and neighboring areas.

Furthermore, because the liquid chemical is entrained within the airflows even under non-windy or at slow vehicle speeds the liquid chemical is better transferred to vegetation because the liquid chemical is entrained within the air flows and is in effect pushed into the vegetation to better wet the surfaces of leaves and be absorbed by the vegetation.

In this way, spraying of chemicals such as herbicides and pesticides can continue when wind speeds are greater than 20 km/h. Also, vehicles moving at relatively high speeds of 50, 60, 70, and 80 km/h can spray chemicals. Thus, for example spray trains that spray the railway track and associated embankments with herbicides can operate at higher speeds, improving efficiency and savings costs, and leading to less disruption. This is achieved, because a blower operating with an air diverter create airstreams that entrain spray droplets and force the spray droplets towards the ground within an air shield, which mitigates the effects of wind and air movement caused by movement of the vehicle itself. To put this another way, the air shield reduces drift when spraying from a moving vehicle.

Thus, as the vehicle moves around an environment, imagery of that environment is analyzed and used to activate the spray unit(s) to kill the weeds, pests or insects, or to apply fertilizer. Not only can spraying be carried out at high vehicle speeds and with high wind speeds, but particular spots on the ground or particular plants can be better targeted for spraying, because the spray is directed down to that spot and does not drift away the transfer efficiency to plants is improved. This reduces the amount of chemical required, and reduces the environmental impact of the spraying.

In an example, each diverter of the at least one diverter has an air intake with a first cross sectional area and has an air exhaust having a second cross sectional area. A body of the diverter extends from the air intake to the air exhaust, and wherein the first cross sectional area is greater than the second cross sectional area.

In this way, the diverter not only diverts air flow downwards to help entrain the sprayed liquid but the velocity of air exiting the diverter will be greater than the velocity of air entering the diverter. The continuity equation, assuming incompressible air, then provides that the velocity of air exiting the diverter will be proportional to the velocity of air entering the diverter multiplied by the first cross sectional area and divided by the second cross sectional area. Thus, the downwards directed air can have an increased velocity to overcome wind and/or air movement due to movement of the vehicle. In this way, the augmenting effect of the diverted downward flow is increased.

In an example, a ratio between the first cross sectional area to the second cross sectional area is variable.

In this way the speed of air leaving the diverter can be varied for a constant speed of the vehicle.

In an example, the processing unit is configured to vary the ratio between the first cross sectional area to the second cross sectional area on the basis of one or more of: a speed of the vehicle; a wind speed; the analyzed at least one image.

Thus, diverters can be changed to take into account wind conditions, and can have a structure similar to the variable exhaust nozzles of aircraft jet engines. The diverters can then also take into account the speed of the vehicle and also what is being sprayed. For example, when spraying a small area such as spraying a small area of weeds or an individual weed with a herbicide, the processing unit can close down the exhaust area of the diverter in order to help entrain the herbicide into a smaller jet of air enabling a smaller footprint on the ground to be sprayed. Furthermore, when the wind becomes stronger and or the vehicle moves faster, the exhaust area of the diverter can be decreased in size to increase the speed of the air that is entraining the spray droplets, thereby overcoming the effects of the wind and/or increased vehicle speed.

In an example, the diverter is configured to direct the airflow into the second downward directed air flow at an angle between 45 degrees and 90 degrees to the fore-aft axis.

In other words, downward directed can be vertically down or air flow that is directed at an angle of 45 degrees to the vertical.

In an example, at least one part of the body of the diverter is moveable with respect to a fixed part of the body of the diverter, and wherein the processing unit is configured to move the at least one moveable part of the body on the basis of one or more of: a speed of the vehicle; a wind speed; the analyzed at least one image.

In this way, air flow can be directed vertically downwards or at an angle of 45 degrees to the vertical, or at angles between these extremes. Thus, depending upon the exact situation, air can be diverted as required.

In an example, each air blower of the at least one air blower is configured to vary a speed of the air blown.

In an example, the processing unit is configured to control an air blower to vary the speed of the air blown on the basis of one or more of: a speed of the vehicle; a wind speed; the analyzed at least one image.

In an example, each blower is configured to vary a direction of the blown air with respect to the fore-aft axis. The processing unit is configured to control a blower to vary the direction of the air blown on the basis of one or more of: a speed of the vehicle; a wind speed; the analyzed at least one image.

In other words, under control of the processing unit the blowers can be rotated with respect to the vehicle in order that the direction of air being blown can account for wind, vehicle speed, and what is being sprayed.

In an example, the processing unit is configured to analyze the at least one image to determine at least one location for activation of the at least one chemical spray unit.

In an example, analysis of the at least one image to determine at least one location for activation of the at least one chemical spray unit comprises a determination of at least one location of vegetation.

In other words, image processing can be used in order to determine the areas of vegetation in the acquired imagery, and the chemical spray units can be activated at those locations.

According to a second aspect, there is provided a Spray system, comprising:
at least one camera;
a spray apparatus according to the first aspect, wherein the spray apparatus is mounted on a vehicle;
at least one reservoir configured to hold at least one liquid chemical, wherein the at least one reservoir is mounted on the vehicle.

The at least one camera is configured to acquire the at least one image. The at least one chemical spray unit and the at least one reservoir are configured to be in fluid connection with each other. The spray apparatus is configured to spray the at least one weed control chemical.

In this way, a vehicle can move around an environment and control weeds within that environment using chemical spray with increased transfer efficiency on the basis of imagery of that environment. In this way, imagery can be acquired by one platform, for example one or more drones that fly over an environment. That information is sent to an apparatus, that is mounted on a vehicle. The apparatus then activates the spray units at the correct locations within the environment.

In an example, the at least one camera is mounted on the vehicle.

In this manner, the system can operate in real time or quasi real time, by acquiring imagery, analyzing it to determine when and where to activate the chemical spray units.

According to some embodiments, there is provided a spraying method for a vehicle, comprising:
a) providing a processing unit with at least one image of an environment;
b) analyzing by the processing unit the at least one image to activate at least one chemical spray unit mounted on a vehicle;
c) ejecting a liquid chemical by the at least one chemical spray unit;
d) blowing air by at least one air blower mounted on the vehicle into a first downward directed air flow with respect to a fore-aft axis of the vehicle that is parallel to the ground;
e) directing air moving as a consequence of movement of a vehicle by at least one diverter mounted on the vehicle into a second downward directed air flow with respect to the fore-aft axis of the vehicle that is parallel to the ground; and
wherein, a chemical spray unit of the at least one chemical spray unit is positioned relative to one or more air blowers of the at least one air blower and is positioned relative to one or more air diverters of the at least one air diverter such that the ejected liquid chemical is at least partially entrained within the first downward directed air flow and is at least partially entrained within the second downward directed air flow.

According to some embodiments, there is provided a computer program element for controlling an apparatus according to the apparatus of the first aspect and/or system according to the second aspect, which when executed by a processor is configured to carry out the method of the third aspect.

Advantageously, the benefits provided by any of the above aspects equally apply to all of the other aspects and vice versa.

BRIEF DESCRIPTION OF THE DRAWINGS

Exemplary embodiments will be described in the following with reference to the following drawings.

DETAILED DESCRIPTION OF EXEMPLARY EMBODIMENTS

Figure 1:
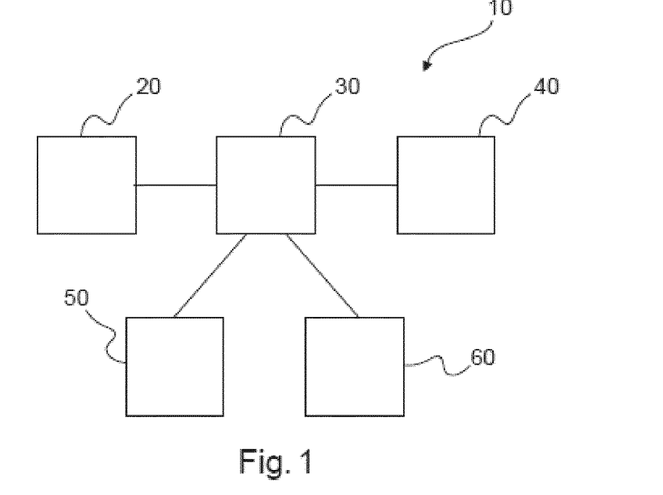
FIG. 1 shows a schematic set up of an example of a spray apparatus for a vehicle.

FIG. 1 shows an example of a spray apparatus 10 for a vehicle. The spray apparatus 10 comprises an input unit 20, a processing unit 30, at least one chemical spray unit 40, at least one air blower 50, and at least one air diverter 60. The input unit 20 is configured to provide the processing unit 30 with at least one image of an environment. The processing unit 30 is configured to analyze the at least one image to activate the at least one chemical spray unit 40. The at least one chemical spray unit 40 is configured to eject a liquid chemical. The at least one air blower 50 is configured to blow air into a first downward directed air flow with respect to a fore-aft axis of a vehicle that is parallel to the ground. The at least one air diverter 60 is configured to direct air moving as a consequence of movement of the vehicle into a second downward directed air flow with respect to the fore-aft axis of the vehicle. A chemical spray unit of the at least one chemical spray unit 40 is positioned relative to one or more air blowers of the at least one air blower 50 and is positioned relative to one or more air diverters of the at least one air diverter 60 such that the ejected liquid chemical is at least partially entrained within the first downward directed air flow and is at least partially entrained within the second downward directed air flow.

In an example, each unit of the chemical spray unit comprises a chemical spray gun or nozzle and a conduit configured to lead to a chemical reservoir. In an example, the at least one chemical spray unit comprises at least one chemical reservoir.

Thus, "at least one chemical spray unit" can mean at least one spray gun (or nozzle). Also, "at least one chemical spray unit" can mean at least one spray gun (or nozzle) with associated liquid transfer conduits. Also, "at least one chemical spray unit" can mean at least one spray gun (or nozzle) with associated liquid transfer conduits and at least one chemical reservoir.

In an example, the apparatus comprises an output unit that is in communication with the processing unit, and wherein the output unit is configured to activate the at least one chemical spray unit.

In an example, the apparatus is operating in real-time, where images are acquired and immediately processed and the chemical spray unit(s) is immediately used to activate those spray units, for example to control weeds/insects/pests/feed plants. Thus, for example a vehicle can acquire imagery of its environment and process that imagery to activate the spray units in real-time.

In an example, the apparatus is operating in an offline mode, where images are acquired (by the apparatus or by another appropriate system) of an environment and later processed by the apparatus to activate the chemical spray unit. Thus for example, a first vehicle, such as a car, train, lorry or unmanned aerial vehicle (UAV) or drone equipped with one or more cameras can travel within an environment and acquire imagery. This imagery can then be processed, later, by the apparatus that is moving around the around, to activate the chemical spray units.

In an example, the at least one chemical spray unit comprises an atomizer configured to atomize the liquid weed control chemical. In an example the atomizer is configured to use compressed air to atomize the liquid weed control chemical. In an example, the atomizer comprises a spinning metal disc. Thus, the rotational bell system can be used to atomize the liquid weed control chemical.

It is to be noted that "atomized" does not mean individual atoms, but relates to the standard use of this term with respect to spray systems, meaning a fine mist of particles that can range in sizes.

In an example, the processing unit is configured to analyze the at least one image to determine at least one mode of operation of the at least one chemical spray unit to be used.

In other words, an image or images of an environment have been acquired. Chemical spray unit(s) can operate in a number of different modes of operation, such as spraying different chemicals, varying a distance between the spray unit and the ground or a weed for example. The apparatus then analyses the image or images to determine which one or ones of the available modes of operation of the at least one chemical spray unit should be used in order to best spray at a specific location or locations of the environment.

In this way, the most appropriate mode of operation of spray units can be used for different areas of the environment. Also, at different areas of the environment, different modes of operation of the spray units can be used, where each mode of operation is the most appropriate for each different area.

According to an example, each diverter of the at least one diverter has an air intake with a first cross sectional area and has an air exhaust having a second cross sectional area. A body of the diverter extends from the air intake to the air exhaust, and the first cross sectional area is greater than the second cross sectional area.

According to an example, a ratio between the first cross sectional area to the second cross sectional area is variable.

According to an example, the processing unit is configured to vary the ratio between the first cross sectional area to the second cross sectional area on the basis of one or more of: a speed of the vehicle; a wind speed; the analyzed at least one image.

In an example, the ratio is varied by varying the second cross sectional area. In an example, the ratio is varied by varying the first cross sectional area. In other words, the throat and/or exit of the diverter can be varied as required.

According to an example, each diverter of the at least one diverter is configured to direct the airflow into the second downward directed air flow at an angle between 45 degrees and 90 degrees to the fore-aft axis.

According to an example, at least one part of the body of each air diverter of the at least one air diverter is moveable with respect to a fixed part of the body of the air diverter. The processing unit is configured then to move the at least one moveable part of the body on the basis of one or more of: a speed of the vehicle; a wind speed; the analyzed at least one image.

According to an example, each air blower of the at least one air blower is configured to vary a speed of the air blown.

According to an example, the processing unit is configured to vary the speed of the air blown on the basis of one or more of: a speed of the vehicle; a wind speed; the analyzed at least one image.

In an example each blower is a rotational blower. In an example, each blower is a centrifugal blower. In an example, each blower is a fan. In an example, the speed of air blown by an air blower is varied by varying an angle of blades within the fan. In an example, the speed of air blown by the air blower is varied by varying a rotational speed of the air blower.

According to an example, each blower is configured to vary a direction of the blown air with respect to the fore-aft axis. The processing unit is configured then to vary the direction of the air blown on the basis of one or more of: a speed of the vehicle; a wind speed; the analyzed at least one image.

In an example, the at least one moveable part of the diverter is the means by which a direction of the air blown by a blower is varied.

According to an example, the processing unit is configured to analyze the at least one image to determine at least one location for activation of the at least one chemical spray unit.

According to an example, analysis of the at least one image to determine at least one location for activation of the at least one chemical spray unit comprises a determination of at least one location of vegetation.

In an example, the processing unit is configured to determine the at least one mode of operation of the at least one chemical spray unit to be used at that at least one location of vegetation in the environment.

In an example, analysis of the at least one image to determine the at least one location for activation of the at least one chemical spray unit comprises a determination of at least one type of weed.

In other words, the at least one chemical spray unit can be activated in a manner to account for the type or types of weeds to be controlled. Thus for example, one type of weed may require only a short duration of liquid weed control spray to kill that weed, but a different type of weed may require a longer duration of liquid weed control spray to kill the weed. Also, the chemical weed control units can be linked to more than one reservoir of weed control chemical, for example a very strong weed control chemical can be in one tank and used to kill difficult to control weeds, and a second tank can house a weaker chemical. Thus, the strong chemical can be used sparingly, only when it is needed in relation to a detection that difficult to control weeds have been found. The weaker chemical can then be used to control other weeds, thereby providing environmental and cost benefits. Pesticides, insecticides and fertilizers can similarly be sprayed on the basis of image processing of acquired imagery.

In an example, analysis of the at least one image comprises utilization of a machine learning algorithm.

In an example, the machine learning algorithm comprises a decision tree algorithm.

In an example, the machine learning algorithm comprises an artificial neural network.

In an example, the machine learning algorithm has been taught on the basis of a plurality of images. In an example, the machine learning algorithm has been taught on the basis of a plurality of images containing imagery of at least one type of weed. In an example, the machine learning algorithm has been taught on the basis of a plurality of images containing imagery of a plurality of weeds. Similarly images of pests and insects can be used to train the machine learning algorithm.

In an example, the processing unit is configured to determine the at least one mode of operation of the at least one chemical spray unit to be used based on the type of weed determined to be at that at least one location in the environment.

In other words, the appropriate mode of operation of chemical spray units can be selected to account for the type or types of weeds to be controlled. Thus for example, one type of weed may require only a short duration spray of a particular type of chemical in order to kill that weed, but a different type of weed may require a longer duration of spray of the same chemical to kill the weed. Or, a different chemical can be sprayed on different weeds, or sprayed at a different volume rate per unit time.

In an example, the at least one image was acquired by at least one camera, and wherein the input unit is configured to provide the processing unit with at least one location associated with the at least one camera when the at least one image was acquired.

The location can be a geographical location, with respect to a precise location on the ground, or can be a location on the ground that is referenced to a position of the at least one chemical spray unit. In other words, an absolute geographical location can be utilized or a location on the ground that need not be known in absolute terms, but that is referenced to a location of the at least one chemical spray unit. Thus, by correlating an image with the location where it was acquired, the at least one chemical spray unit can be accurately activated to that location.

In an example, the location is an absolute geographical location.

In an example, the location is a location that is determined with reference to the position of the at least one chemical spray unit. In other words, an image can be determined to be associated with a specific location on the ground, without knowing its precise geographical position, but by knowing the position of the at least one chemical spray unit with respect to that location at the time the image was acquired, the at least one chemical spray unit can then be activated at a later time at that location by moving the at least one chemical spray unit to that location.

In an example, a GPS unit is used to determine, and/or is used in determining, the location of the at least one camera when specific images were acquired.

In an example, an inertial navigation unit is used alone, or in combination with a GPS unit, to determine the location of the at least one camera when specific images were acquired. Thus for example, the inertial navigation unit, comprising for example one or more laser gyroscopes, is calibrated or zeroed at a known location and as it moves with the at least one camera the movement away from that known location in x, y, and z coordinates can be determined, from which the location of the at least one camera when images were acquired can be determined.

In an example, image processing of acquired imagery is used alone, or in combination with a GPS unit, or in combination with a GPS unit and inertial navigation unit, to determine the location of the at least one camera when specific images were acquired.

Figure 2:
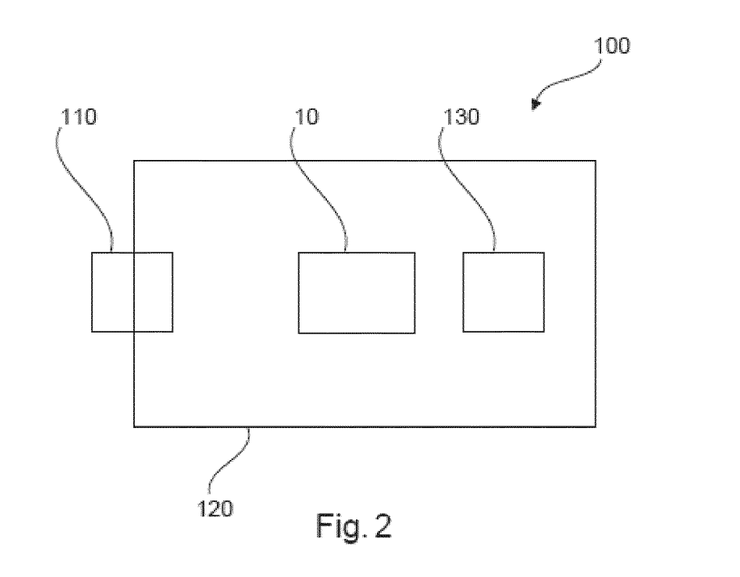
FIG. 2 shows a schematic set up of an example of a spray system.

FIG. 2 shows an example, of a spray system 100. The spray system comprises at least one camera 110, a spray apparatus 10 as described with respect to FIG. 1. The spray apparatus 10 is mounted on a vehicle 120. The spray system 100 also comprises at least one reservoir 130 configured to hold at least one liquid chemical. The at least one reservoir 130 is mounted on the vehicle 120. The at least one camera 110 is configured to acquire the at least one image. The at least one chemical spray unit 40 and the at least one reservoir 130 are configured to be in fluid connection with each other. The spray apparatus 10 is configured to spray the at least one weed control chemical.

According to an example, the at least one camera is mounted on the vehicle.

In an example, the vehicle is a train.

In an example, the vehicle is a lorry or truck or Unimog.

In an example, the vehicle is a tractor.

In an example, the input unit is configured to provide the processing unit with at least one location associated with the at least one camera when the at least one image was acquired. In an example, the location is a geographical location.

In an example, the apparatus is configured to activate the at least one chemical spray unit on the basis of the at least one geographical location associated with the at least one camera when the at least one image was acquired and a spatial relationship between the at least one camera and the at least one chemical spray unit. In this manner, by knowing where the image has been acquired by a camera mounted on a vehicle and also knowing where a chemical spray unit is mounted on the vehicle with respect to the camera, it is simple to take into account the forward speed of the vehicle in order to activate that chemical spray unit at the same location where the image was acquired, and indeed within that imaged area.

Figure 3:
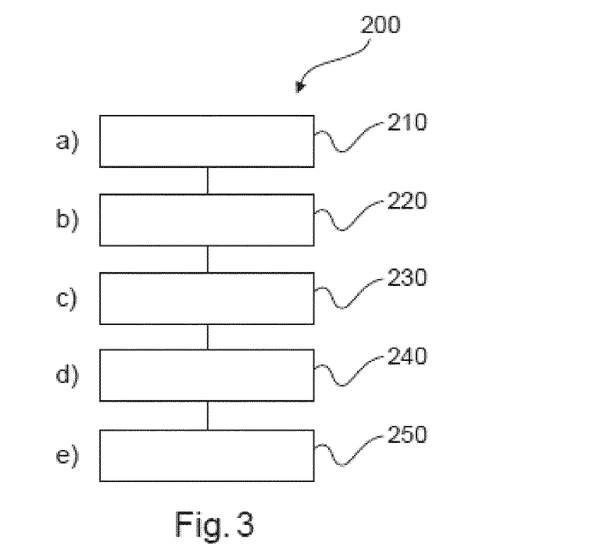
FIG. 3 shows a spraying method for a vehicle.

FIG. 3 shows a spraying method 200 for a vehicle in its basic steps. The method 200 comprises:

in a providing step 210, also referred to as step a), providing a processing unit with at least one image of an environment;

in an analyzing step 220, also referred to as step b), analyzing by the processing unit the at least one image to activate at least one chemical spray unit mounted on a vehicle;

in an ejecting step 230, also referred to as step c), ejecting a liquid chemical by the at least one chemical spray unit;

in an air blowing step 240, also referred to as step d), blowing air by at least one air blower mounted on the vehicle into a first downward directed air flow with respect to a fore-aft axis of the vehicle that is parallel to the ground;

in an air directing step, also referred to as step e), directing air moving as a consequence of movement of a vehicle by at least one diverter mounted on the vehicle into a second downward directed air flow with respect to the fore-aft axis of the vehicle that is parallel to the ground.

A chemical spray unit of the at least one chemical spray unit is positioned relative to one or more air blowers of the at least one air blower and is positioned relative to one or more air diverters of the at least one air diverter such that the ejected liquid chemical is at least partially entrained within the first downward directed air flow and is at least partially entrained within the second downward directed air flow.

In an example, each diverter of the at least one diverter has an air intake with a first cross sectional area and has an air exhaust having a second cross sectional area. A substantially air tight body extends from the air intake to the air exhaust, and the first cross sectional area is greater than the second cross sectional area.

In an example, a ratio between the first cross sectional area to the second cross sectional area is variable.

In an example, the processing unit is configured to vary the ratio between the first cross sectional area to the second cross sectional area on the basis of one or more of: a speed of the vehicle; a wind speed; the analyzed at least one image.

In an example, step e) comprises directing the airflow into the second downward directed air flow at an angle between 45 degrees and 90 degrees to the fore-aft axis.

In an example, a body angle of the diverter is variable, and wherein step e) comprises the processing unit providing output to vary the body angle on the basis of one or more of: a speed of the vehicle; a wind speed; the analyzed at least one image.

In an example, each air blower of the at least one air blower is configured to vary a speed of the air blown.

In an example, step d) comprises the processing unit providing output to vary the speed of the air blown on the basis of one or more of: a speed of the vehicle; a wind speed; the analyzed at least one image.

In an example, each blower is configured to vary a direction of the blown air with respect to the fore-aft axis, and wherein step d) comprises the processing unit providing output to vary the direction of the air blown on the basis of one or more of: a speed of the vehicle; a wind speed; the analyzed at least one image.

The apparatus, system and method for weed control are now described in more detail in conjunction with FIGS. 4-9.

Figure 4:
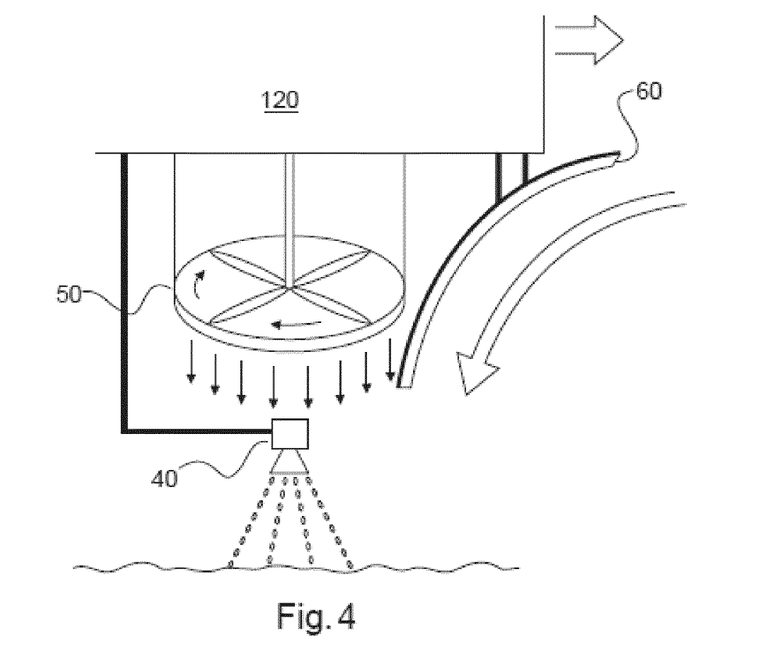
FIG. 4 shows a schematic set up of an example of an air blower, air diverter and chemical spray unit.

FIG. 4 shows a vehicle 120 fitted with an apparatus 10 as discussed above, and has an air blower 50, an air diverter 60 and a chemical spray unit 40, or spray gun, that is spraying a location on the ground. A camera (not shown) acquired imagery that was then analyzed to determine what locations need to be sprayed. The camera could be carried by the vehicle, and image processing be conducted in real time in order to spray a location soon after image acquisition. Or, the images could have been taken earlier, for example by a different vehicle with a camera that passed this location the day before, and image processing indicated locations to be sprayed. The geographic positions of the to be sprayed positions is logged, and then the vehicle having the spray apparatus 10 also has location determining means, such as GPS and/or image processing based location determination means, and then sprays the required locations. For example, the image processing can determine where weeds are located, and those weeds are then sprayed with a herbicide.

The vehicle shown in FIG. 4 has the chemical spray unit ejecting a herbicide below an air blower in the form of a fan. The air from the air blower entrains the spray droplets and forces then towards the ground. Additionally, the vehicle is moving forward and consequently air is moving around and under the vehicle. This can be disruptive to chemical spraying, however an air diverter is positioned to direct some of this air in a downward position around the position where the chemical spray gun is ejecting the spray droplets. This diverted air flow augments that from the fan and provides an increased entraining air flow that forces the chemical spray droplets towards the ground and onto weeds, for example, growing at the spray location.

Figure 5:
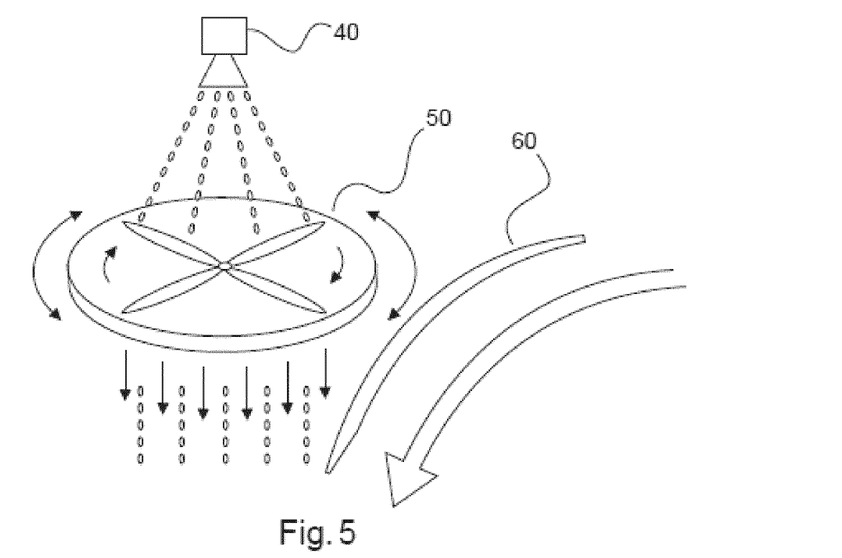
FIG. 5 shows a schematic set up of an example of an air blower, air diverter and chemical spray unit.
Figure 6:
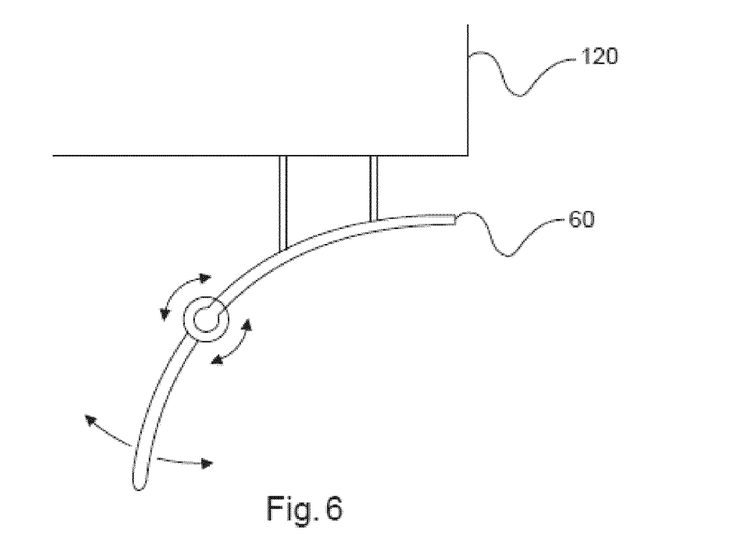
FIG. 6 shows a schematic set up of an example of an air diverter.
Figure 7:
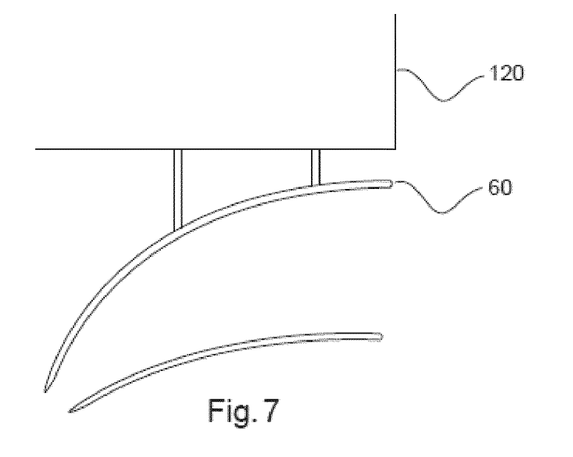
FIG. 7 shows a schematic set up of an example of an air diverter.
Figure 8:
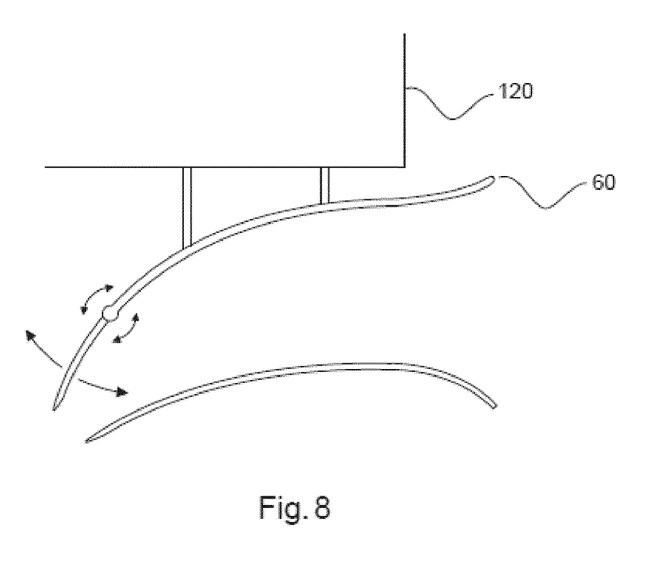
FIG. 8 shows a schematic set up of an example of an air diverter.
Figure 9:
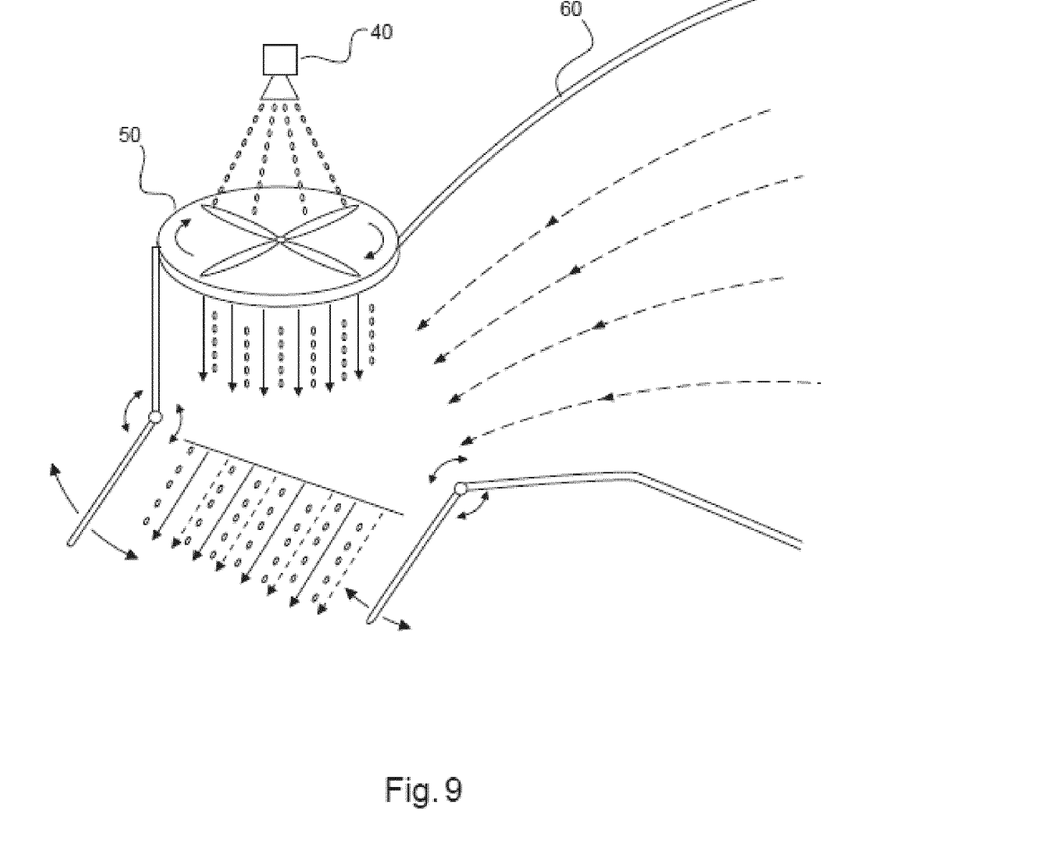
FIG. 9 shows a schematic set up of an example of an air blower, air diverter and chemical spray unit.

FIG. 5 shows an alternative arrangement, where the chemical spray unit is situation above the air blower. This means that the body of the chemical spray unit does not interfere with the blown and diverted air flows, and a greater amount of the downward directed air is available for entraining the sprayed chemical droplets.

FIG. 6 shows details of an example of an air diverter, where the end part of the diverted is moveable around a joint. This enables the diverted air flow to be controlled, when necessary.

FIG. 7 shows details of an example of a diverter. The diverter shown in FIG. 7 can have two geometries. In one geometry, the cross section as shown in FIG. 7 is the same at different positions across the front of the vehicle. Thus, the diverter is in effect made from two curved aero foils, spaced apart from each other. The two ends, at the near side of the vehicle and at the far side of the vehicle can be closed to stop air moving sideways, and thus the diverter has a rectangular cross section at different positions into the diverter. However, the diverter has a wider opening that its exit, and as air under these conditions is incompressible the speed of air exiting the diverter is great than that entering the diverter. This is governed by the continuity equation, which provides that:

$$V_{Exit} = V_{Entry} * \frac{\text{Area}_{Exit}}{\text{Area}_{Entry}}$$

Where, $V_{Exit}$ is the speed of air exiting the diverter, $V_{Entry}$ the speed of air entering the diverter, and $\text{Area}_{Exit}$ and $\text{Area}_{Entry}$ are the exit and entry cross sectional areas of the diverter respectively.

Thus, the diverter can create a downward directed airflow that has a speed greater than the air flowing past the vehicle, and this additionally helps stop drift of the spray.

The other geometry for the diverter shown in FIG. 7, is a more circularly symmetric diverter, where the cross section down the diverter is "circular". However, the cross section can be elliptical and ultimately tending toward that of a rectangle discussed above.

FIG. 8 shows a similar diverter to that shown in FIG. 7, except that the entrance throat has been widened to capture more incoming air, and a part of the exit of the diverter is adjustable around a joint. This geometry particularly applies to the rectangular cross section diverter discussed above.

FIG. 9 shows a diverter and air blower, where the air blower blows air into the diverted air stream provided by the air diverter. The exits of the diverter are variable in a manner similar to the exit of a jet engine exhaust. The chemical spray unit sprays into the air blower air stream, and spray droplets are first entrained in the blow air. Then the spray droplets are entrained in the diverted air and the blown air. The air diverter can have a square or rectangular cross section, which simplifies the variable exit of the diverter that is then formed as two hinged flaps at the top and bottom.

Image Processing to Enable Analysis to Determine a Weed Type

A specific example of how an image is processed, and determined to be suitable for image processing in order that a type of weed can be determined is now described:

1. A digital image—in particular a colored image—of a weed is captured.
2. Areas with a predefined color and texture within the digital image are contoured within a boundary contour. Typically, one may expect one contoured area from one weed plant. However, there may also be more than one contoured area from different, potentially not connected leafs, from two weed plants, or the like.—Such a detection or determining process detects boundaries of green areas of the digital image. During this process at least one contoured area—e.g., one or more leafs, as well as one or more weed plants—may be built comprising pixels relating to the weed within a boundary contour. However, it may also be possible, that the digital image has captured more than one leaf and/or the stem. Consequently, more than one contoured area may be determined.
3. Determining if the boundary contour covers a large enough area, and determining a sharpness (e.g. degree of focus) of the image data within the boundary contour. This firstly ensures that there will be sufficient image data upon which a determination can be made as to the type of weed, and secondly determines that a minimum quality of the digital image will be satisfied in order that the type of weed can be made.
4. If both criteria in 3) are satisfied, the digital image, and specifically that within the boundary contour is sent to the processing unit for image analysis by the artificial neural network to determine the type of weed as described above.

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses invention.

Further on, the computer program element might be able to provide all necessary steps to fulfill the procedure of an exemplary embodiment of the method as described above.

According to further exemplary embodiments, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to further exemplary embodiments, a medium for making a computer program element available for downloading is provided, which computer program element is arranged to perform a method according to one of the previously described embodiments.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While embodiments of the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A spray apparatus for a vehicle, comprising:
   an input unit;
   a processing unit;
   at least one chemical spray unit;
   at least one air blower; and
   at least one air diverter;
   wherein, the input unit provides the processing unit with at least one image of an environment;
   wherein, the processing unit analyzes the at least one image to activate the at least one chemical spray unit;
   wherein, the at least one chemical spray unit ejects a liquid chemical;
   wherein, the at least one air blower blows air into a first downward directed air flow with respect to a fore-aft axis of a vehicle that is parallel to the ground;
   wherein, the at least one air diverter directs air moving as a consequence of movement of the vehicle into a second downward directed air flow with respect to the fore-aft axis of the vehicle; and
   wherein, a chemical spray unit of the at least one chemical spray unit is positioned relative to one or more air blowers of the at least one air blower and is positioned relative to one or more air diverters of the at least one air diverter such that the ejected liquid chemical is at least partially entrained within the first downward directed air flow and is at least partially entrained within the second downward directed air flow.

2. The spray apparatus of claim 1, wherein each diverter of the at least one diverter has an air intake with a first cross sectional area and has an air exhaust having a second cross sectional area, wherein a body of the diverter extends from the air intake to the air exhaust, and wherein the first cross sectional area is greater than the second cross sectional area.

3. The spray apparatus of claim 2, wherein a ratio between the first cross sectional area to the second cross sectional area is variable.

4. The spray apparatus of claim 3, wherein the processing unit is varies the ratio between the first cross sectional area to the second cross sectional area based on one or more of: a speed of the vehicle; a wind speed; the analyzed at least one image.

5. The spray apparatus of claim 1, wherein the diverter directs the air into the second downward directed air flow at an angle between 45 degrees and 90 degrees to the fore-aft axis.

6. The spray apparatus of claim 5, wherein at least one part of a body of the diverter is moveable with respect to a fixed part of the body of the diverter, and wherein the processing unit moves the at least one moveable part of the body based on one or more of: a speed of the vehicle; a wind speed; the analyzed at least one image.

7. The spray apparatus of claim 1, wherein each air blower of the at least one air blower varies a speed of the air blown.

8. The spray apparatus of claim 7, wherein the processing unit is varies the speed of the air blown based on one or more of: a speed of the vehicle; a wind speed; the analyzed at least one image.

9. The spray apparatus of claim 1, wherein each blower is varies a direction of the blown air with respect to the fore-aft axis, and wherein the processing unit varies the direction of the air blown based on one or more of: a speed of the vehicle; a wind speed; the analyzed at least one image.

10. The spray apparatus of claim 1, wherein the processing unit analyzes the at least one image to determine at least one location for activation of the at least one chemical spray unit.

11. The spray apparatus of claim 10, wherein analysis of the at least one image to determine at least one location for activation of the at least one chemical spray unit comprises a determination of at least one location of vegetation.

12. A spray system, comprising:
    at least one camera;
    the spray apparatus of claim 1, wherein the spray apparatus is mounted on a vehicle;
    at least one reservoir to hold at least one liquid chemical, wherein the at least one reservoir is mounted on the vehicle;
    wherein, the at least one camera acquires the at least one image;
    wherein, the at least one chemical spray unit and the at least one reservoir are in fluid connection with each other; and
    wherein, the spray apparatus sprays the at least one weed control chemical.

13. The spray system of claim 12, wherein the at least one camera is mounted on the vehicle.

14. A spraying method for a vehicle, comprising:
    providing a processing unit with at least one image of an environment;
    analyzing the at least one image with the processing unit to activate at least one chemical spray unit mounted on a vehicle;
    ejecting a liquid chemical by the at least one chemical spray unit;
    blowing air by at least one air blower mounted on the vehicle into a first downward directed air flow with respect to a fore-aft axis of the vehicle that is parallel to the ground;

directing air moving as a consequence of movement of the vehicle by at least one diverter mounted on the vehicle into a second downward directed air flow with respect to the fore-aft axis of the vehicle that is parallel to the ground; and wherein, a chemical spray unit of the at least one chemical spray unit is positioned relative to one or more air blowers of the at least one air blower and is positioned relative to one or more air diverters of the at least one air diverter such that the ejected liquid chemical is at least partially entrained within the first downward directed air flow and is at least partially entrained within the second downward directed air flow.

15. A non-transitory computer readable medium storing one or more programs, the one or more programs comprising instructions, which when executed by a processor, cause the processor to:

provide a processing unit with at least one image of an environment from an input unit;

analyze the at least one image with the processing unit to activate at least one chemical spray unit mounted on a vehicle;

eject a liquid chemical by the at least one chemical spray unit;

blow air by at least one air blower mounted on the vehicle into a first downward directed air flow with respect to a fore-aft axis of the vehicle that is parallel to the ground;

direct air moving as a consequence of movement of the vehicle by at least one diverter mounted on the vehicle into a second downward directed air flow with respect to the fore-aft axis of the vehicle that is parallel to the ground; and wherein, a chemical spray unit of the at least one chemical spray unit is positioned relative to one or more air blowers of the at least one air blower and is positioned relative to one or more air diverters of the at least one air diverter such that the ejected liquid chemical is at least partially entrained within the first downward directed air flow and is at least partially entrained within the second downward directed air flow.

* * * * *